US005511019A

United States Patent [19]

Grycewicz et al.

[11] Patent Number: 5,511,019

[45] Date of Patent: Apr. 23, 1996

[54] JOINT TRANSFORM CORRELATOR USING TEMPORAL DISCRIMINATION

[75] Inventors: Thomas J. Grycewicz, Belmont; Jehad Khoury, Arlington; Charles L. Woods, Stow, all of Mass.

[73] Assignee: The United States of America as represented by the Secretary of the Air Force, Washington, D.C.

[21] Appl. No.: 234,523

[22] Filed: Apr. 26, 1994

[51] Int. Cl.[6] .............................. G06E 3/00; G02B 27/46; G06F 15/336

[52] U.S. Cl. ........................... 364/822; 359/561; 382/278

[58] Field of Search ..................................... 364/819–822; 359/559, 561, 305, 306; 382/42, 278–280

[56] References Cited

U.S. PATENT DOCUMENTS

| | | | |
|---|---|---|---|
| 5,029,220 | 7/1991 | Juday | 364/822 |
| 5,040,140 | 8/1991 | Horner | 364/822 |
| 5,111,515 | 5/1992 | Javidi | 359/559 |
| 5,119,443 | 6/1992 | Javidi et al. | 364/822 |
| 5,367,579 | 11/1994 | Javidi et al. | 359/561 |

*Primary Examiner*—Tan V. Mai
*Attorney, Agent, or Firm*—Robert L. Nathans; Stanton E. Collier

[57] ABSTRACT

A joint transform correlator has modulators for temporally modulating a first optical input signal at a first frequency and a second optical input signal at a second frequency. An image sensor in the Fourier plane forms a product signal modulated by temporal sum and difference frequencies of the first and second frequencies. The product signal is thereafter demodulated at the temporal sum or difference frequency and the resulting optical signal is inverse Fourier transformed to recover the desired cross correlation signals.

16 Claims, 3 Drawing Sheets

FIG. 5 (a)

| STATE | INPUT R | INPUT S | OUTPUT |
|---|---|---|---|
| $S_1$ | ON | ON | $\|R\|^2+\|S\|^2+2\,\mathrm{Re}\{R^* S\}$ |
| $S_2$ | ON | OFF | $\|R\|^2$ |
| $S_3$ | OFF | ON | $\|S\|^2$ |
| $S_4$ | OFF | OFF | 0 |

DEMODULATION:
$S_1 - S_2 - S_3 + S_4$

FIG. 5 (b)

| STATE | INPUT R | INPUT S | OUTPUT |
|---|---|---|---|
| $S_1$ | 0 | 0 | $\|R\|^2+\|S\|^2+2\,\mathrm{Re}\{R^* S\}$ |
| $S_2$ | 0 | 180 | $\|R\|^2+\|S\|^2-2\,\mathrm{Re}\{R^* S\}$ |
| $S_3$ | 180 | 0 | $\|R\|^2+\|S\|^2-2\,\mathrm{Re}\{R^* S\}$ |
| $S_4$ | 180 | 180 | $\|R\|^2+\|S\|^2+2\,\mathrm{Re}\{R^* S\}$ |

DEMODULATION:
$S_1 - S_2$

FIG. 5 (c)

| STATE | INPUT R | INPUT S | OUTPUT |
|---|---|---|---|
| $S_1$ | 0 | 0 | $\|R\|^2+\|S\|^2+2\,\mathrm{Re}\{R^* S\}$ |
| $S_2$ | 0 | 90 | $\|R\|^2+\|S\|^2$ |
| $S_3$ | 90 | 0 | $\|R\|^2+\|S\|^2$ |
| $S_4$ | 90 | 90 | $\|R\|^2+\|S\|^2+2\,\mathrm{Re}\{R^* S\}$ |

DEMODULATION:
$S_1 - S_2$

JOINT TRANSFORM CORRELATOR USING TEMPORAL DISCRIMINATION

STATEMENT OF GOVERNMENT INTEREST

The invention described herein may be manufactured or used by or for the government for governmental purposes without the payment of any royalty thereon.

BACKGROUND OF THE INVENTION

The Joint Transform Correlator (JTC) correlates two inputs by taking the fourier transform of their joint fourier power spectrum. See FIG. 1 of U.S. Pat. No. 5,040, 140 issued to Horner et al. A reference, r(x,y), and a scene, s(x,y), are displayed side by side in the input plane. The input images are offset from the optical axis by distances $x_1$ and $x_2$, yielding an input:

$$\text{input}(x,y)=r(x-x_1,\ y)+s(x-x_2,\ y) \quad (1)$$

A lens is used to form the fourier transform of the input plane on a detector. The result is the joint fourier power spectrum of the inputs:

$$|T(\alpha,\beta)|^2=|R(\alpha,\beta)|^2+|S(\alpha,\beta)|^2+2Re\{R^*(\alpha,\beta)S(\alpha,\beta)\exp[j2\pi\alpha(x_1-x_2)]\} \quad (2)$$

The output from the first stage of the JTC is used as the input to a second fourier transform stage. The result of this transform is the correlation of the input plane with itself.

$$\begin{aligned} o(x,y) &= [r(x+x_1,y)+s(x+x_2,y)] \quad [r(x+x_1,y)+s(x+x_2,y)] \quad (3)\\ &= r(x,y) \quad r(x,y)+s(x,y] \quad s(x,y)+ r(x+x_1,y) \quad s(x+x_2,y)+ r(-x+x_1,-y) \quad s(-x-x_2,-y) \end{aligned}$$

Here the ★ symbol denotes correlation.

Both auto-correlation and cross-correlation products are present in the JTC output. The reference and the scene will both auto-correlate to a peak centered at the coordinates (0,0). The center of the cross-correlation outputs will be displaced from the optical axis by the distance $\pm(x_1+x_2)$.

A source of difficulty is that the reference and scene auto-correlation signals often dominate the output. If the self-correlation spectra are broad, these signals can overlap the cross-correlation outputs. This is particularly troublesome in the multiple target scenario. If a feature in the input scene is repeated, the cross-correlations between instances of the repeated feature appear as correlation peaks in the output plane.

The traditional solution is spatial separation of the inputs. If the reference and scene are far apart in the input plane, there will be regions of the output plane which correspond only to valid cross-correlations. This is because the distance involved between the two correlating objects will require that one be located in the scene and the other be in the reference. Correlations detected at shorter distances are assumed to be self correlations and are ignored. This solution works well, but it is not ideal since much of the input scene must be filled with blank space to provide the necessary separations. Also, the auto-correlations remain a major noise source, even when their peaks are not in the valid cross-correlation area.

BRIEF SUMMARY OF THE INVENTION

In accordance with the invention, separating optical output cross-correlation signals from their unwanted by-products in a joint transform correlator involves modulating the input signals in time. The Fourier plane detector squares the magnitude of the sum of the transforms of the inputs. This mixes the temporal and spatial components of the signal. Demodulating the output signal at the sum or difference of the input frequencies will separate the cross-correlation components of the joint spectrum from the auto-correlation components. This process of mixing two time modulated signals at the Fourier plane camera is called superheterodyne image mixing to emphasize the conceptual similarity between this process and a superheterodyne radio receiver.

BRIEF DESCRIPTION OF THE DRAWINGS

Other features and advantages of the invention will become apparent upon study of the following description taken in conjunction with the drawings in which:

FIG. 5(*a*), 5(*b*) and 5(*c*) illustrate the four states for the case of on-off modulation.

DETAILED DESCRIPTION OF PREFERRED EMBODIMENTS OF THE INVENTION

Figure 1:
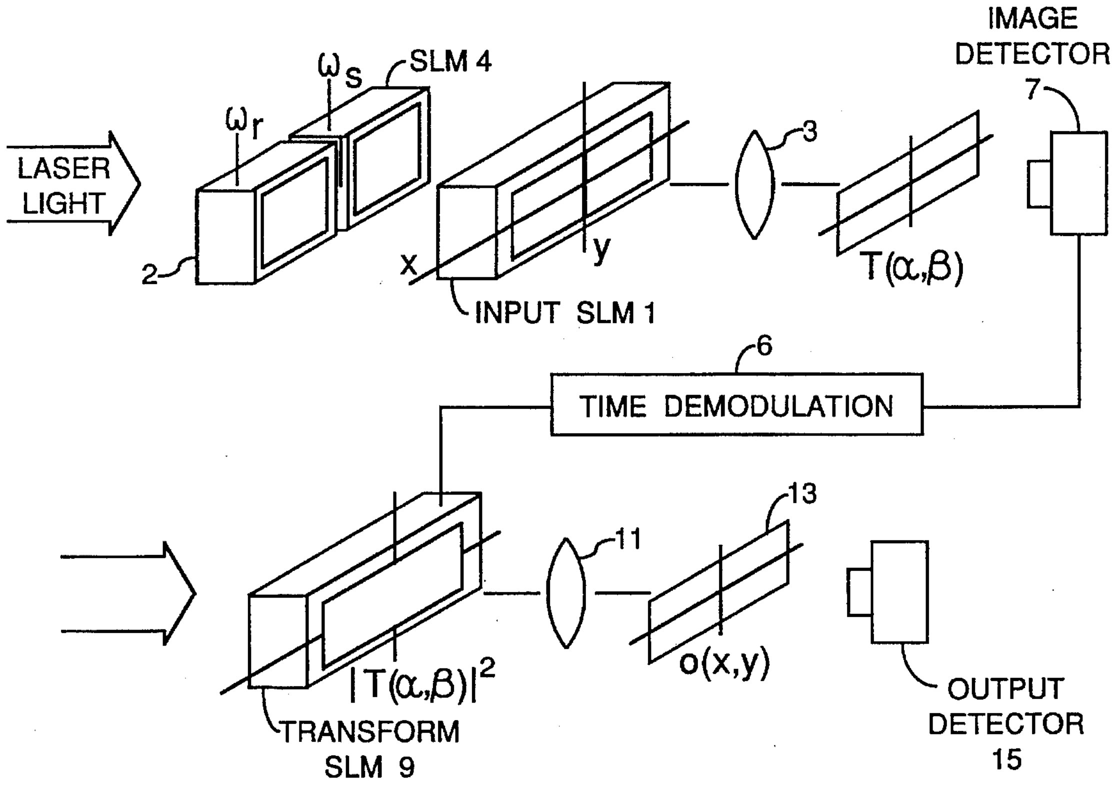
FIG. 1 illustrates a joint transform correlator using superheterodyne image mixing and embodying the invention.

The superheterodyne image mixer of the invention is shown in FIG. 1. The system is a modification of the JTC which includes time modulation of the input signals and demodulation of the joint fourier spectrum. The conventional JTC employs an input spatial light modulator (SLM) I which stores the input signal and the reference signal side by side. SLM 1 is illuminated with laser light and lens 3 causes the joint power spectrum to be produced in the transform plane 5 and focussed on image detector 7, which can be a CCD imaging camera or sensor and is a square law device. The output of the image sensor is electrically inserted into transform SLM 9 which is illuminated by laser light. Lens 11 produces the inverse fourier transform in output plane 13. Output detector 15 retrieves this signal which is the output of the system. In accordance with one embodiment of the invention, time modulators 2 and 4 are provided to time modulate the input signals. A time demodulator 6 is coupled between detector 7 and transform SLM 9. Temporal and spatial modulation is indicated using separate modulators for clarity. In practice the input SLM can perform both functions. The key is that the input signals are modulated both spatially and temporally. Since the signal modulation takes place in different dimensions (the x,y plane and the time domain) the modulation order does not matter.

When the time modulated signals are detected in the fourier plane 5 using a square law detector such as image detector 7, the detection process will mix the temporal components of the signal, creating new frequency components. It will be shown that the signal components at the sum and difference of the input frequencies contain only information from the cross-correlation between the reference and scene. Amplitude, phase, or polarization modulated input signals can all be used to produce an amplitude modulated output in the fourier plane.

While pixel by pixel time demodulation is clearly possible, devices to implement an efficient real time system for sinusoidal signal demodulation are not currently available. The response time of the electro-optical components will also not be addressed. We assume that the time modulation is slow with respect to frame refresh rates and response times for the spatial light modulators and cameras in the system.

In order to model a simple amplitude modulation system, sinusoidal amplitude modulation is assumed with a modulation depth of 100%:

$$\text{input}(x,y,t)=r(x-x_1,y)\,[1+\cos(j\omega_1 t)]+s(x-x_2,y)[1+\cos(j\omega_2 t)] \quad (4)$$

The resulting input to the fourier plane detector is:

$$\begin{aligned} T(x,y) &= \Im\{r(x-x_1,y)[1+\cos(\omega_1 t)] + s(x-x_2,y)[1+\cos(\omega_2 t)]\} \\ &= R(\alpha,\beta)\exp(j2\pi\alpha x_1)[1+\cos(\omega_1 t)] + S(\alpha,\beta)\exp(j2\pi\alpha x_2)[1+\cos(\omega_2 t)] \end{aligned} \quad (5)$$

When this signal is detected using a square law detector the resulting output contains seven temporal frequency components. Each of the input signals results in a DC component, a component at its modulation frequency, and a component at double this frequency. The cross products result in terms modulated at the sum and difference frequencies of the input signals. This allows temporal processing to be used to separate the correlation components. Since the signals modulated at the sum and difference frequencies contain only the desired cross-correlation information, demodulation at one of these frequencies allows extraction of the cross-correlation information.

$$\begin{aligned} |T(\alpha,\beta)|^2 = {} & 1.5|R(\alpha,\beta)|^2 + 1.5|S(\alpha,\beta)|^2 + \\ & 2\,Re\{R^*(\alpha,\beta)S(\alpha,\beta)\exp[j2\pi\alpha(x_2-x_1)]\} + [2|R(\alpha,\beta)|^2 + \\ & 2\,Re\{R^*(\alpha,\beta)S(\alpha,\beta)\exp[j2\pi\alpha(x_2-x_1)]\}]\cos(\omega_1 t) + [2|S(\alpha,\beta)|^2 + \\ & 2\,Re\{R^*(\alpha,\beta)S(\alpha,\beta)\exp[j2\pi\alpha(x_2-x_1)]\}]\cos(\omega_2 t) + \\ & 0.5|R(\alpha,\beta)|^2\cos(2\omega_1 t) + 0.5|S(\alpha,\beta)|^2\cos(2\omega_2 t) + \\ & 2\,Re\{R^*(\alpha,\beta)S(\alpha,\beta)\exp[j2\pi\alpha(x_2-x_1)]\}\,[\cos(\omega_1+\omega_2)t + \\ & \cos(\omega_1-\omega_2)t] \end{aligned} \quad (6)$$

After time demodulation, the cross-correlation signal drives the transform plane spatial light modulator at the input of the second stage of the JTC. The transform of this signal yields the cross-correlation output:

$$|T_d(\alpha,\beta)|^2=2.0Re\{R^*(\alpha,\beta)X(\alpha,\beta)\}\cos(\omega_1-\omega_2)t \quad (7)$$

$$o(x,y)=r(x+x_1,y)\star s(x+x_2,y)+r(x-x_1,y)\star s(x-x_2,y)$$

Since the transform plane SLM will be driven only with the cross-correlation signal, rather than a combination of cross-correlation and self-correlation terms, the output will be free from peaks resulting from multiple targets and will have a greatly improved signal to noise ratio.

Now consider modulating the phase of each of the optical input signals in time:

$$\begin{aligned} \text{input}(x,y,t) &= r(x-x_1,y)\exp[-j\delta_1\sin(\omega_1 t)] + s(x-x_2,y)\exp[-j\delta_2\sin(\omega_2 t)] \\ &= r(x-x_1,y)\sum_{m=-\infty}^{\infty} J_m(\delta_1)\exp(-jm\omega_1 t) + s(x-x_2,y)\sum_{n=-\infty}^{\infty} J_n(\delta_2)\exp(-jn\omega_2 t) \end{aligned} \quad (8)$$

Here ω is the modulation frequency, δ is the modulation amplitude, and $J_n$ is the nth Bessel function. This results in time modulated fourier plane signal:

$$|T(\alpha,\beta)|^2=R^*(\alpha,\beta)R(\alpha,\beta)+S^*(\alpha,\beta)S(\alpha,\beta)$$

$$\begin{aligned} |T(\alpha,\beta)|^2 = {} & R^*(\alpha,\beta)R(\alpha,\beta) + S^*(\alpha,\beta)S(\alpha,\beta) + \\ & Re\,\{R^*(\alpha,\beta)S(\alpha,\beta)\exp\,[j2\pi\alpha\,(x_2 - x_1)]\} \sum\sum_{m,n=-\infty}^{\infty} J_m(\delta_1)J_n(\delta_2)\cos\,(m\omega_1 - n\omega_2)t \end{aligned} \quad (9)$$

The cross product is modulated at a number of frequencies. The terms with m and n equal to −1, 0, or 1 will generally yield the largest contributions as well as being the most convenient to demodulate. Analyzing this output reveals that the cross correlation products are amplitude modulated. Phase demodulation of the output is not needed. This is fortunate, since the peak amplitude of the joint fourier signal spans orders of magnitude, and phase detection would be quite difficult.

Analyzing the output also reveals that the cross correlation products are the only amplitude modulated outputs. Since the input reference and scene images are at constant amplitude, the output components arising from their fourier spectra are of constant amplitude. Detection at a specific frequency is not needed as temporal high pass filtering is sufficient to separate the cross correlation terms from the self-correlation terms.

Since the self-correlation transform components are not modulated, it is not necessary to modulate both inputs. If one input is phase modulated and the other is constant, the cross-correlation alone will be amplitude modulated in the transform plane. In addition to simplifying the input, this results in more flexibility for demodulation since only one frequency is involved for the entire system.

The polarization of the inputs can also be modulated. When the two inputs are at the same polarization they will add coherently at the detector. When the polarizations are orthogonal the signals add incoherently. Expressing the input as the sum of signals at two perpendicular polarizations:

$$\begin{aligned} \text{input}(x,y,t) = {} & \hat{x}\,\{r(x-x_1,y)[1+\cos(j\omega_1 t)] + s(x-x_2,y)[1+\cos[j\omega_2 t)]\} + \\ & \hat{y}\,\{r(x-x_1,y)[1+\sin(j\omega_1 t)] + s(x-x_2,y)[1+\sin(j\omega_2 t)]\} \end{aligned}$$

Each polarization generates time modulated outputs. In the fourier plane the intensity of the signal is detected. Since the polarization components are orthogonal, they will add incoherently, yielding:

$$
\begin{aligned}
|T(\alpha,\beta)|^2 = & \{R^*(\alpha,\beta)R(\alpha,\beta)+S^*(\alpha,\beta)S(\alpha,\beta)\}\left\{\begin{array}{c}2+2\cos(\omega_1 t)+2\sin(\omega_1 t)+2\cos(\omega_2 t)+2\sin(\omega_2 t)+\\ \cos^2(\omega_1 t)+\sin^2(\omega_1 t)+\cos^2(\omega_2 t)+\sin^2(\omega_2 t)\end{array}\right\}+\\
& \left\{\begin{array}{c}R^*(\alpha,\beta)S(\alpha,\beta)\exp[j2\pi\alpha(x_2-x_1)]+\\ R(\alpha,\beta)S^*(\alpha,\beta)\exp[j2\pi\alpha(x_2-x_1)]\end{array}\right\}\left\{\begin{array}{c}2+\cos(\omega_1 t)+\sin(\omega_1 t)+\cos(\omega_2 t)+\sin(\omega_2 t)+\\ \cos(\omega_1 t)+\cos(\omega_1 t)+\sin(\omega_2 t)+\sin(\omega_2 t)\end{array}\right\}\\
= & 2\left\{\begin{array}{c}|R(\alpha,\beta)|^2+|S(\alpha,\beta)|^2+\\ Re\{R^*(\alpha,\beta)S(\alpha,\beta)\}\end{array}\right\}\{2+\cos(\omega_1 t)+\sin(\omega_1 t)+\cos(\omega_2 t)+\sin(\omega_2 t)\}+2Re\{R^*(\alpha,\beta)S(\alpha,\beta)\}\cos[(\omega_1-\omega_2)t]
\end{aligned}
\tag{11}
$$

Once the correlation signals have been encoded through time modulation, they must be demodulated at the frequency which carries the cross-correlation information. This presents a more difficult problem than modulating the signals since devices built specifically for pixel by pixel temporal demodulation of an entire image are not currently available. A number of possible approaches are proposed for time demodulation at 6 in FIG. 1.:

Digital demodulation: Given a slow modulation of the input (tens of herz or slower) the output can be sampled a frame at a time and be demodulated by frame to frame processing. A possible algorithm to use is a digital implementation of a boxcar amplifier, with integration over many frames of data. This method is very slow, but is straightforward to implement. Thus it is a good choice for a proof of concept experiment, but does not show promise for a practical system.

Smart pixels: Demodulation circuitry can be incorporated into the VLSI design of the detector array for a camera or a optically addressed spatial light modulator. If time demodulation capability is built into the fourier plane detection hardware, pixel by pixel electrical demodulation is possible in real time. Incorporating demodulation into the pixels of an optically addressed SLM would make very fast, very simple systems possible.

Once the signal has been demodulated a second fourier transform must be taken to form the correlation (output) plane. The demodulated output will include pixels with both negative and positive values, and have an average value of zero. Ideally this signal would be the input for the second transform stage of the JTC. Since currently available devices do not allow for both positive and negative signals (a phase reversal), a compromise is needed.

By using an SLM capable of binary phase modulation, the large DC spike in the center of the output plane can be avoided. The central DC spike is the result of a non-zero average amplitude in the transform plane. If the fourier plane signal has both positive and negative phase, the average amplitude will be near zero. This results in an output plane with no central DC spike.

Another approach is to simply add a DC offset so that all of the values are positive. This allows operation with an SLM which modulates amplitude. Adding this bias restores the central peak. However, this restored peak will be much narrower and contain much less energy than the original central peak, which included all of the self-correlation information for both the reference and scene images.

The central peak defines the non-valid region in the center of the correlation plane. In the conventional JTC the width of this peak is determined by the width of the reference and scene self-correlation signals. With the self correlation information removed, the width of this central peak will be much narrower than in a conventional JTC. Therefore the reference and scene inputs can be placed much closer together in the input plane. This greatly eases the design constraint mandating that large amounts of empty area be placed in the input plane in between the reference and scene images in order to assure that all detected peaks represent valid correlations between the input and reference scenes.

Another advantage to be gained from using temporal signal separation is that it requires much less dynamic range to represent the cross-correlation signal in the transform plane than it does to represent the full joint transform. This generally allows more effective use of the dynamic range of the spatial light modulator used in the second stage of the JTC.

Perhaps the easiest form of time modulation to implement is the case where the signals result from square wave or two level modulations rather than sinusoidal modulation. For example, the simplest amplitude modulation is simply turning the inputs on and off. Since each input has two possible states, there are four possible output states (see FIG. 2). The output can be demodulated based on these four states. In a sense, the temporal frequency content of the signals has become immaterial. The demodulation process can now be reduced to simple frame subtraction. By subtracting the self-correlation terms from the joint correlation term, the cross-correlation terms are isolated:

$$
|R(\alpha,\beta)\exp[j2\pi\alpha x_1]+S(\alpha,\beta)\exp[j2\pi\alpha x_2]|^2-|R(\alpha,\beta)|^2-|S(\alpha,\beta)|^2 = 2Re\{R^*(\alpha,\beta)S(\alpha,\beta)\exp[j2\pi\alpha(x_1-x_2)]\} \tag{12}
$$

It is interesting to note that the processing of the data frames captured when implementing a bi-level modulation scheme exactly parallels the mathematics involved in modeling the superheterodyne mixer in the temporal fourier domain.

Figure 2:
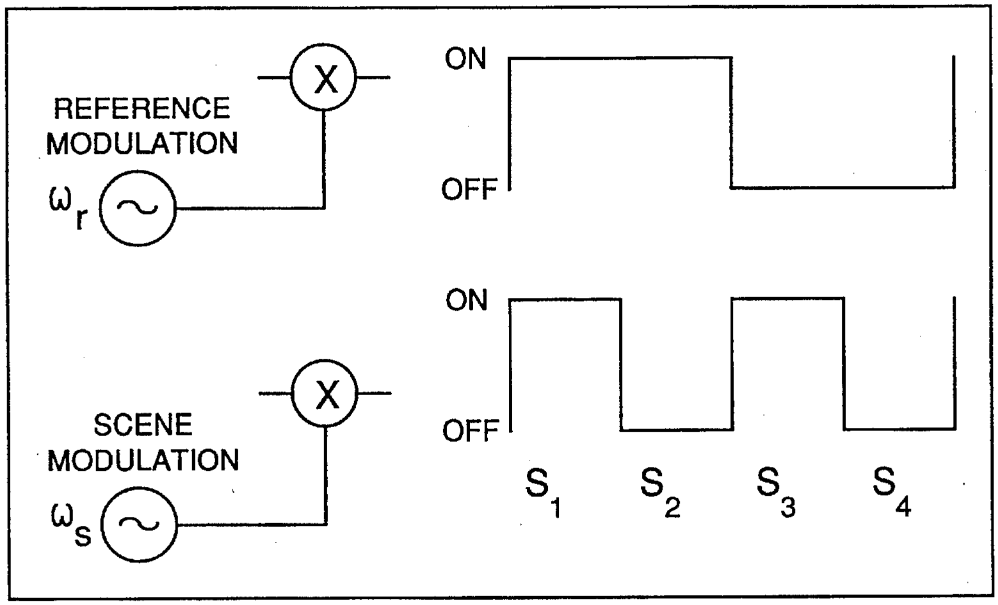
FIG. 2 illustrates square wave modulation resulting in only four input states.

The four states for the case of square wave modulation are shown in FIG. 2 and FIGS. 5(*a*), 5(*b*), and 5(*c*). FIGS. 2 and 5(*a*) show on-off square wave amplitude modulation. State $S_1$ is the ordinary joint transform. States $S_2$ and $S_3$ show the reference only turned on and the scene only turned on. In state $S_4$ the entire input image is turned off. Note that the state $S_4$ is used in the demodulation process even though its value is nominally zero. This is because it is needed to compensate for any bias in the physical system. In order to demodulate the signal, all that is necessary is to subtract the outputs on a pixel by pixel basis. It is not necessary to form all four transforms each time a correlation is done. $S_4$ does not need to be measured each time the system is used since it will not change. It can simply be measured once and stored. If the system is used to compare a reference to a number of scene images, then only states $S_1$ and $S_3$ need to be transformed.

Similar bi-level processing can also be applied to phase or polarization modulation. In each of these cases the cross-correlation information is obtained by frame subtraction using two appropriately chosen input frames. FIG. 5(*b*) shows the states for phase modulation. (The phase shift does not need to be a full 180 degrees, but this provides the most efficient computation.) Here the demodulation only requires the subtraction of two frames - the normal JTC input and the input with a phase shift on either the reference or scene. FIG.

5(*c*) shows the states for phase modulation. Here demodulation is similar to phase modulation.

Figure 3:
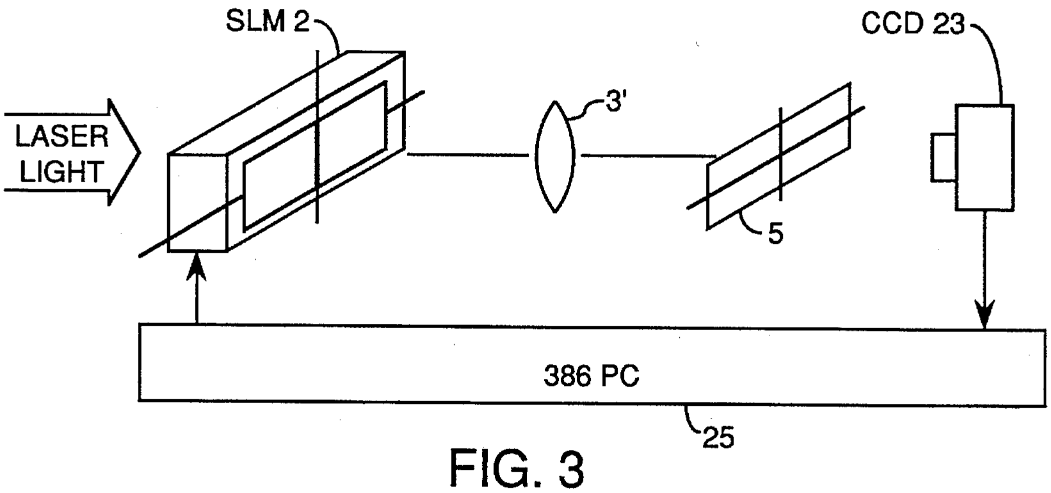
FIG. 3 illustrates an experimental setup employing a Semetek MOSLM.

FIG. 3 shows an experimental setup. A Semetek 128×128 Sight-Mod[R] MOSLM 21 is used with a Cohu CCD camera 23 and a personal computer 25 to form a single spatial light modulator joint transform correlator. See FIG. 2 of U.S. Pat. No. 5,040, 140 issued to Horner et al., and incorporated by reference herein illustrating such a single spatial light modulator JTC. The output in the transform plane produced by lens 3' is a 256×256 grey scale image. Each experiment consisted of taking four transform outputs for the full joint transform, the reference only, the scene only, and all zeros inputs. Demodulation was done by frame subtraction. The demodulated output and the joint transform output were reduced to a 128×128 format and binarized. The result was the transform plane input. For the conventional joint transform signal, the binarization threshold was set at the global median. For the demodulated signal, zero was used as the binarization threshold.

The problem was to find the "O"s in "BOSTON". Random binary background clutter was added to the image of the word "BOSTON". The experimental results for locating the "O"s in the noisy "BOSTON" image were satisfactory. The peak-to-noise ratio (PNR)is calculated for the weaker of the two detection peaks (equation 13). The peak to secondary ratio (PSR) compares the smaller target peak to the largest non-target intensity measurement in the valid output zone (equation 14).

$$PNR = 10 \log \left[ \frac{\text{Intensity of peak pixel}}{\frac{1}{N} \Sigma \text{ Intensity of non-peak pixels}} \right] \quad (13)$$

$$PSR = 10 \log \left[ \frac{\text{Intensity of peak pixel}}{\text{Intensity of largest non-peak pixel}} \right] \quad (14)$$

The experimental results and computer simulations are in agreement in showing roughly 6 dB of improvement in both PNR and PSR. In both cases the experimental results are 4 dB lower than predicted through simulation. The primary reason for this is that the contrast ratio of the SLM was not considered in the model. The simulation contrast ratio was infinite. The average contrast ratio for a single pixel on the SLM used was measured to be 6:1. This was considered fair performance when the MOSLM was manufactured in 1988.

Figure 4:
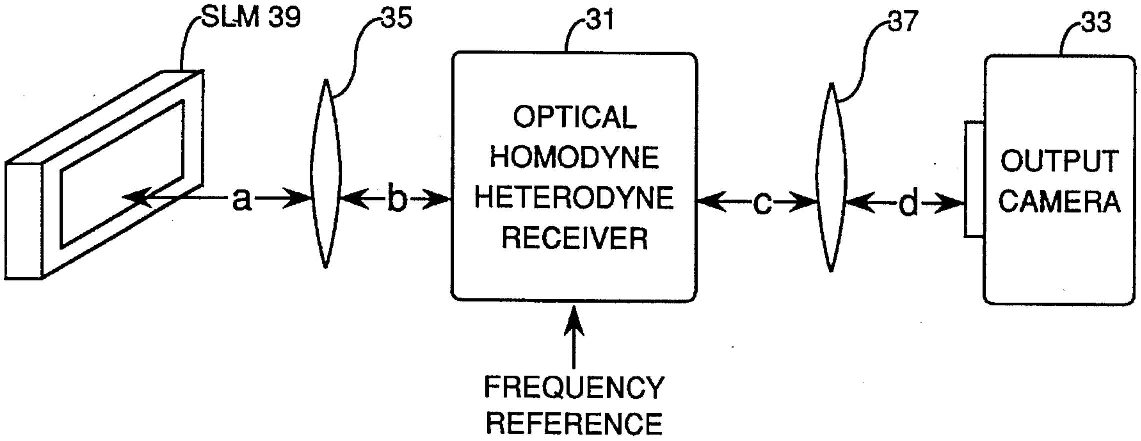
FIG. 4 illustrates the use of an optical homodyne-hetrodyne receiver for demodulating the time modulated joint power spectrum.

Demodulation can also be carried out using a photorefractive crystal in a homodyne-hetrodyne receiver configuration. Systems of this type, such as the optical lock-in amplifier, can be used to demodulate the optical image. The reference is an optical signal modulated at the input sum or difference frequency. The receiver 31 in FIG. 4, demodulates its input at this reference frequency. The distances a, b, c, and d associated with lenses 35 and 37 are chosen so that the image formed at the output camera 33 is the Fourier transform of the input after demodulation.

Receiver 31, uses a photorefractive crystal such as bismuth silicon oxide or barium titanate to mix together two temporally modulated optical signals. The usual configuration involves an input image which includes components which are temporally modulated at multiple frequencies, and a reference which is a time modulated plane wave. The output is that portion of the input scene which is frequency matched to the reference, or its phase conjugate signal.

The advantage of using this kind of detector for the modulated joint transform signal is that an all optical path is possible, preserving the processing parallelism of the optical path. In this case one would use an optically addressed SLM 39 to form the input to the second stage of the JTC shown in FIG. 4. Another possibility is to use a photorefractive crystal in a photorefractive JTC configuration. Both of these options allow the joint transform of the input to be detected and relayed to the second stage of the correlator without being reduced to a serial electronic signal, and therefor preserving the parallel optical path. These types of optical homodyne-hetrodyne receivers are known to skilled workers in the art. See Khoury et al., Optical Letters 16, 1442 (1991); G. H. deMontchenault et al., Applied Physics Letters 50. 1794 (1987); Journal of Applied Physics 63. 624 (1988).

It should now be appreciated that time modulation can be used to eliminate the undesired self correlation terms in the JTC output. This results in drastic PNR/PSR improvement, removal of input plane constraints, and elimination of multiple target problems. By considering the demodulation of the four unique input states present in square wave modulation, the demodulation process reduces to simple frame subtraction. Both simulation and experimental results have shown that by applying four frame binary amplitude modulation followed by demodulation through frame subtraction yields a PNR/PSR improvement of approximately 6 dB over the results obtained by implementing a conventional binary JTC using the same hardware.

In summary, a major limitation on the optical joint transform correlator (JTC) is that the output plane is dominated by unwanted self correlation products. The present invention uses time modulation and demodulation to separate the output plane correlation components. Time modulation is applied to the JTC inputs, resulting in a time modulated joint transform signal. Demodulation of the transform plane separates the transform components into cross- and self-correlation terms. This results in system PNR/PSR improvement, removal of input plane location constraints, and elimination of the detection problems which result from multiple targets.

Since other embodiments of the invention will become apparent to the skilled workers in the art, the scope of the invention is to be defined solely by the terms of the following claims and art recognized equivalents thereof.

What is claimed is:

1. Method of separating optical signals from their unwanted by-products comprising the steps of:

(a) providing at least two spatially modulated optical input signals;

(b) modulating at least one of said spatially modulated optical input signals in time;

(c) thereafter nonlinearly mixing said spatially modulated optical input signals to form a product signal modulated at temporal sum and difference frequencies of the spatially modulated optical input signals modulated in accordance with step (b);

(d) demodulating said product signal at the temporal sum or difference frequencies in order to recover those portions of the signal which are the result of mixing said optical input signals modulated in accordance with step (c); and (e) inverse Fourier transforming the signal resulting from carrying out step (d).

2. Method of claim 1 wherein step (b) comprises amplitude modulating at least one of said spatially modulated optical input signals.

3. Method of claim 4 wherein step (d) is performed by frame subtraction on a pixel-by-pixel basis.

4. Method of claim 1 wherein said input signals are amplitude modulated with a two level square wave signal.

5. Method of claim 4 wherein step (d) is performed by frame subtraction on a pixel-by-pixel basis.

6. Method of claim 1 wherein step (d) is performed by frame subtraction on a pixel by-pixel-pixel basis.

7. Method of separating correlation optical signals from their unwanted by-products in a joint transform correlator comprising the steps of:

(a) providing at least two spatially modulated optical input signals to be correlated with respect to each other;

(b) modulating at least one of said spatially modulated optical input signals in time;

(c) producing a joint power spectrum of said spatially modulated optical input signals modulated in accordance with step (b);

(d) thereafter mixing the joint power spectrum of said spatially modulated optical input signals to form a product signal modulated by temporal sum and difference frequencies of the spatially modulated optical input signals modulated in accordance with step (b);

(e) demodulating said product signal at the temporal sum or difference frequencies in order to recover those portions of the signal which are the result of mixing said optical input signals modulated in accordance with step (b);

(f) inverse Fourier transforming the signal resulting from carrying out step (e).

8. Method of claim 7 wherein step (b) comprises amplitude modulating at least one of said spatially modulated optical input signals.

9. Method of claim 8 wherein step (e) is performed by frame subtraction on a pixel-by-pixel basis.

10. Method of claim 7 wherein said first and second input signals are amplitude modulated with a two level square wave signal.

11. Method of claim 9 wherein step (e) is performed by frame subtraction on a pixel-by-pixel basis.

12. Method of claim 7 wherein step (e) is performed by frame subtraction on a pixel-by-pixel basis.

13. A joint transform correlator comprising:

(a) optical signal input means for providing a first and second spatially modulated optical input signal to be cross-correlated;

(b) first transform means for producing a power spectrum of said first and second optical input signals;

(c) modulation means for temporally modulating at least one of said optical input signals;

(d) nonlinear mixing means for thereafter mixing said spatially modulated optical input signals to form a product signal;

(e) demodulation means for demodulating said product signal in order to recover those portions of the signal which are the result of mixing said optical input signals; and (f) second transform means for inverse Fourier transforming the signal produced by said demodulation means.

14. Apparatus of claim 13 wherein said demodulation means comprises a homodyne-heterodyne receiver.

15. A joint transform correlator comprising:

(a) optical signal input means for providing a first and second spatially modulated optical input signal to be cross-correlated;

(b) first transform means for producing a joint power spectrum of said spatially modulated optical input signals;

(c) modulation means for temporally modulating the first input signal at a first frequency and for temporally modulating the second input signal at a second frequency;

(d) nonlinear mixing means for thereafter mixing said spatially modulated optical input signals to form a product signal modulated by temporal sum and difference frequencies of the spatially modulated optical input signals modulated by said modulation means;

(e) demodulation means for demodulating said product signal at the temporal sum or difference frequencies in order to recover those portions of the signal which are the result of mixing said optical input signals; and (f) second transform means for inverse Fourier transforming the signal produced by said demodulation means.

16. Apparatus of claim 15 wherein said demodulation means comprises a homodyne-hetrodyne receiver.

* * * * *